United States Patent
Toyoda et al.

[11] Patent Number: 5,853,629
[45] Date of Patent: Dec. 29, 1998

[54] METHOD OF LINING THE INTERNAL SURFACE OF A PIPE

[75] Inventors: Shigeru Toyoda, Saitama-ken; Shuichi Yagi; Masaaki Itagaki, both of Kanagawa-ken, all of Japan

[73] Assignee: Tokyo Gas Co., Ltd., Tokyo, Japan

[21] Appl. No.: 746,195

[22] Filed: Nov. 6, 1996

Related U.S. Application Data

[62] Division of Ser. No. 560,928, Nov. 20, 1995, Pat. No. 5,700,405.

[30] Foreign Application Priority Data

| Nov. 28, 1994 | [JP] | Japan | 6-293500 |
| Nov. 28, 1994 | [JP] | Japan | 6-293501 |
| Nov. 29, 1994 | [JP] | Japan | 6-294734 |
| Nov. 29, 1994 | [JP] | Japan | 6-294735 |

[51] Int. Cl.$^6$ .............................. B32B 35/00; E04B 1/16
[52] U.S. Cl. .................. 264/35; 138/97; 264/36; 264/269; 427/235; 427/238; 427/239; 427/294; 427/295; 427/355; 427/385.5; 427/388.1
[58] Field of Search .................. 156/294, 94, 98; 264/35, 36, 269; 427/235, 238, 239, 294, 295, 385.5, 388.1, 429, 430.1, 435, 443.2, 355, 434.4, 434.5

[56] References Cited

U.S. PATENT DOCUMENTS

| 3,041,204 | 6/1962 | Green . |
| 3,137,318 | 6/1964 | Maneri et al. . |
| 5,202,157 | 4/1993 | Tomoyasu et al. . |
| 5,447,664 | 9/1995 | Ito et al. . |

FOREIGN PATENT DOCUMENTS

4-114773   4/1992   Japan .

*Primary Examiner*—Karen Aftergut
*Attorney, Agent, or Firm*—Nikaido Marmelstein Murray & Oram, LLP

[57] ABSTRACT

Methods of lining the internal surface of a pipe, include first inserting two lining pigs into the pipe and then introducing a batch of resin thereinto, or inserting one lining pig between two batches of a resin, or first inserting a lining pig and then inserting two batches of a resin with another lining pig therebetween, or first introducing a lining pig made of a soft material capable of deforming so as to pass through a narrow-passing section and then introducing a batch of a resin into the pipe, causing the resin to move forward until the front end of the resin reaches an inner end of the pipe, and sucking the resin back from the inner end so as to line the internal surface of the pipe with the resin. The methods use improved liquid blocking pigs for use in pipe lining treatment, each of such pigs includes a spherical body made of a soft resilient material and at least one flexible liquid barrier diaphragm interposed in the spherical body.

1 Claim, 14 Drawing Sheets

METHOD OF LINING THE INTERNAL SURFACE OF A PIPE

This is a divisional of application Ser. No. 08/560,928 filed Nov. 20, 1995 (now U.S. Pat. No. 5,700,405).

BACKGROUND OF THE INVENTION

The present invention relates to methods of lining the internal surface of a pipe, in particular to methods of lining the internal surface of an existing underground pipe.

There has been known a no-excavation underground pipe lining method in which the internal surface of an existing underground gas pipe, water pipe, etc. are lined with a resin without the necessity of any trenching or excavation. For example, a gas service pipe is buried underground branching from a gas main and extending to a user's house. In the method called no-excavation underground pipe lining, there are substantially two steps involved. In the first step, a pressurized liquid is used to produce a pushing force to introduce a necessary amount of resin into the service pipe through an open end thereof and to move the resin through the pipe until the front end of the resin plug flow reaches an inner end (a position branching from the gas main) of the pipe. In the second step, a suction force is used to suck the resin back from the inner end so as to line the internal surface of the pipe with the resin.

In the above first step, prior to introducing the resin into the pipe, a lining pig is at first inserted into the pipe so that the it is located in the front of the resin plug flow while the resin is moved forward. In the above second step, such a lining pig serves to even a resin lining layer formed on the internal surface of the pipe so as to obtain a uniform thickness for the resin layer along the entire length of the pipe.

However, since a gas service pipe usually involves a tee member having a recess portion or involves a larger diameter portion along the length thereof, the lining pig is easy to enter or drop into these places, resulting in a problem that there would be no lining pig which can be used to produce a uniform resin lining layer on the internal surface of the pipe Further, since a gas service pipe may also involve a narrow-passing section such as valve along its length, it will be difficult for a conventional lining pig to pass therethrough. As a result, a desired lining treatment proves to be impossible.

Moreover, in the above first step, after the resin has been introduced into the pipe, a resin transporting pig, a liquid absorbing material and a liquid blocking pig are inserted behind the resin, so that the pressurized liquid is prevented from mixing into the resin while the resin is moved forward and backward in the pipe. But, a conventional liquid blocking pig sometimes proves to be insufficient to prevent a liquid from mixing into the resin, resulting in a liquid-containing resin that has a deteriorated adhesive property and hence can not adhere to the internal surface of the pipe.

SUMMARY OF THE INVENTION

An object of the present invention is to provide an underground pipe lining method capable of ensuring at least one lining pig so as to form an even resin lining layer having a uniform thickness on the internal surface of an existing underground pipe.

Another object of the present invention is to provide an underground pipe lining method capable of lining the internal surface of an existing underground pipe involving a narrow-passing section.

A further object of the present invention is to provide an underground pipe lining method capable of preventing a pressurized liquid from mixing into a resin flow, ensuring a sufficient adhesive property for the resin to form a firm resin lining layer on the internal surface of an existing underground pipe.

According to a first aspect of the present invention, there is provided a method of lining the internal surface of a pipe, said method comprising the steps of inserting two lining pigs into the pipe from an open end thereof, introducing a necessary amount of a resin into the pipe from the open end subsequent to the insertion of the two lining pigs, inserting behind the resin a resin transporting pig, a liquid absorbing material and a liquid blocking pig into the pipe, injecting a necessary amount of pressurized liquid into the pipe subsequent to the insertion of the liquid blocking pig, thereby forcing the two lining pigs, the resin, the resin transporting pig, the liquid absorbing material and the liquid blocking pig to move forwardly until the front end of the resin reaches an inner end of the pipe, and sucking back the injected liquid such that the liquid blocking pig, the liquid absorbing material, the resin transporting pig, the resin and at least one lining pig are moved backwardly so as to line the internal surface of the pipe with the resin and obtain an even resin lining layer by means of the at least one lining pig.

According to a second aspect of the present invention, there is provided another method of lining the internal surface of a pipe, said method comprising the steps of introducing a first batch of a resin into the pipe from an open thereof, inserting a lining pig into the pipe from the open end subsequent to the introduction of the first batch of the resin, introducing a second batch of the resin into the pipe subsequent to the insertion of the lining pig, inserting behind the second batch of the resin a resin transporting pig, a liquid absorbing material and a liquid blocking pig into the pipe, injecting a necessary amount of pressurized liquid into the pipe subsequent to the insertion of the liquid blocking pig, thereby forcing the resin, the lining pig, the resin transporting pig, the liquid absorbing material and the liquid blocking pig to move forwardly until the front end of the resin reaches an inner end of the pipe, and sucking back the injected liquid such that the liquid blocking pig, the liquid absorbing material, the resin transporting pig, the resin and the lining pig are moved backwardly so as to line the internal surface of the pipe with the resin and obtain an even resin lining layer by means of the lining pig.

According to a third aspect of the present invention, there is provided a further method of lining the internal surface of a pipe, said method comprising the steps of inserting a first lining pig into the pipe from an open end thereof, introducing a first batch of a resin into the pipe the open end subsequent to the insertion of the first lining pig, inserting behind the first batch of the resin a second lining pig into the pipe, introducing a second batch of the resin into the pipe subsequent to the insertion of the second lining pig, inserting behind the second batch of the resin a resin transporting pig, a liquid absorbing material and a liquid blocking pig into the pipe, injecting a necessary amount of pressurized liquid into the pipe subsequent to the insertion of the liquid blocking pig, thereby forcing the resin, the lining pigs, the resin transporting pig, the liquid absorbing material and the liquid blocking pig to move forwardly until the front end of the resin reaches an inner end of the pipe, and sucking back the injected liquid such that the liquid blocking pig, the liquid absorbing material, the resin transporting pig, the resin and at least one lining pig are moved backwardly so as to line the internal surface of the pipe with the resin and obtain an even resin lining layer by means of the at least one lining pig.

According to a fourth aspect of the present invention, there is provided a method of lining the internal surface of a pipe involving a narrow-passing section, said method comprising the steps of inserting a lining pig into the pipe from an open end thereof, said lining pig being made of a soft material capable of deforming so as to pass through the narrow-passing section, introducing a necessary amount of a resin into the pipe from the open end subsequent to the insertion of the lining pig, inserting behind the resin a resin transporting pig, a liquid absorbing material and a liquid blocking pig into the pipe, injecting a necessary amount of pressurized liquid into the pipe subsequent to the insertion of the liquid blocking pig, thereby forcing the lining pigs, the resin, the resin transporting pig, the liquid absorbing material and the liquid blocking pig to move forwardly until the front end of the resin reaches an inner end of the pipe, and sucking back the injected liquid such that the liquid blocking pig, the liquid absorbing material, the resin transporting pig, the resin and the lining pig are moved backwardly so as to line the internal surface of the pipe with the resin and obtain an even resin lining layer by means of the lining pig.

According to a fifth aspect of the present invention, there is provided a further method of lining the internal surface of a pipe, said method comprising the steps of inserting a lining pig into the pipe from an open end thereof, introducing a necessary amount of a resin into the pipe from the open end subsequent to the insertion of the lining pig, inserting behind the resin a first liquid blocking pig, a liquid absorbing material and a second liquid blocking pig into the pipe, injecting a necessary amount of pressurized liquid into the pipe subsequent to the insertion of the second liquid blocking pig, thereby forcing the lining pig, the resin, the first liquid blocking pig, the liquid absorbing material and the second liquid blocking pig to move forwardly until the front end of the resin reaches an inner end of the pipe, and sucking back the injected liquid such that the first liquid blocking pig, the liquid absorbing material, the second liquid blocking pig, the resin and the lining pig are moved backwardly so as to line the internal surface of the pipe with the resin and obtain an even resin lining layer by means of the lining pig. Each of the first and second liquid blocking pigs comprises a spherical body made of a soft resilient material, and at least one flexible liquid barrier diaphragm interposed in the spherical body.

The above objects and features of the present invention will become more understood from the following description with reference to the accompanying drawings.

DETAILED DESCRIPTION OF THE PREFERRED EMBODIMENTS

Figure 1:
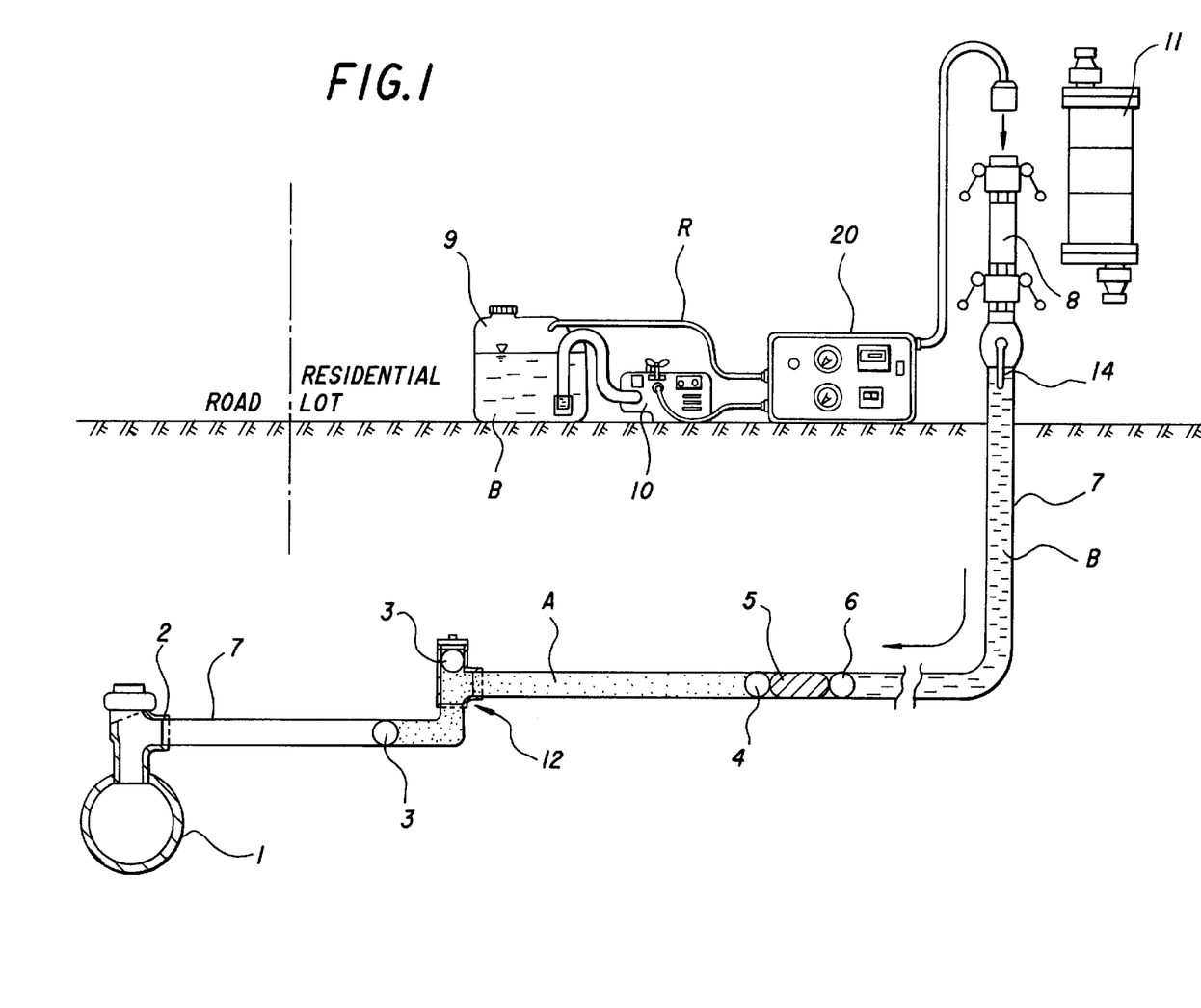
FIG. 1 is an explanatory view illustrating a first step of a method according to the first aspect of the present invention.

Referring to FIG. 1 illustrating a first step of a method according to the first aspect of the present invention, an existing gas service pipe 7 is buried under ground branching from a gas main 1 and extending to a user's house. Close to an open end 14 of the gas service pipe 7 are disposed a liquid injection controlling device 20, a liquid pump 10 and a liquid tank 9, connected in series toward pipeline by means of several hoses. In the drawing, a hose R is used to allow an extra liquid to flow back to the liquid tank 9 if the pressure of a liquid being supplied through the liquid pump 10 exceeds a predetermined value.

In operation, two lining pigs 3 are together inserted in the pipe 7 through its open end 14. Then, operating the liquid pump 10 and using a resin injection device 11, a necessary amount of resin A for lining the internal surface of the pipe is introduced into the pipe 7 by a force of a pressurized liquid (such as water) being pumped from the liquid tank 9. Afterwards, a resin transporting pig 4, a liquid absorbing material 5 and a liquid blocking pig 6 are introduced into the pipe by the force of the same pressurized liquid, with the use of a pig cassette 8. Subsequently, by continually operating the pump 10, a necessary amount of liquid B is pumped from the liquid tank 9, to flow through the liquid injection controlling device 20 into the pipe 7. In this way, the two lining pigs 3, the resin A, the resin transporting pig 4, the liquid absorbing material 5 and the liquid blocking pig 6 are moved forward through the pipe 7 until the front end of the resin plug flow A reaches an inner end 2 (a position branching from the gas main 1).

As illustrated in FIG. 1, since a gas service pipe 7 usually involves a tee member 12 having a recess portion, a lining pig 3 is easy to enter into it. But, with the use of the method according to the first aspect of the present invention, if one of the lining pigs 3 enters into the recess portion of the tee member 12, another lining pig 3 will continue to move past the lost pig toward the inner end 2, ensuring that at least one lining pig 3 can be used in the second step of the method.

Figure 2:
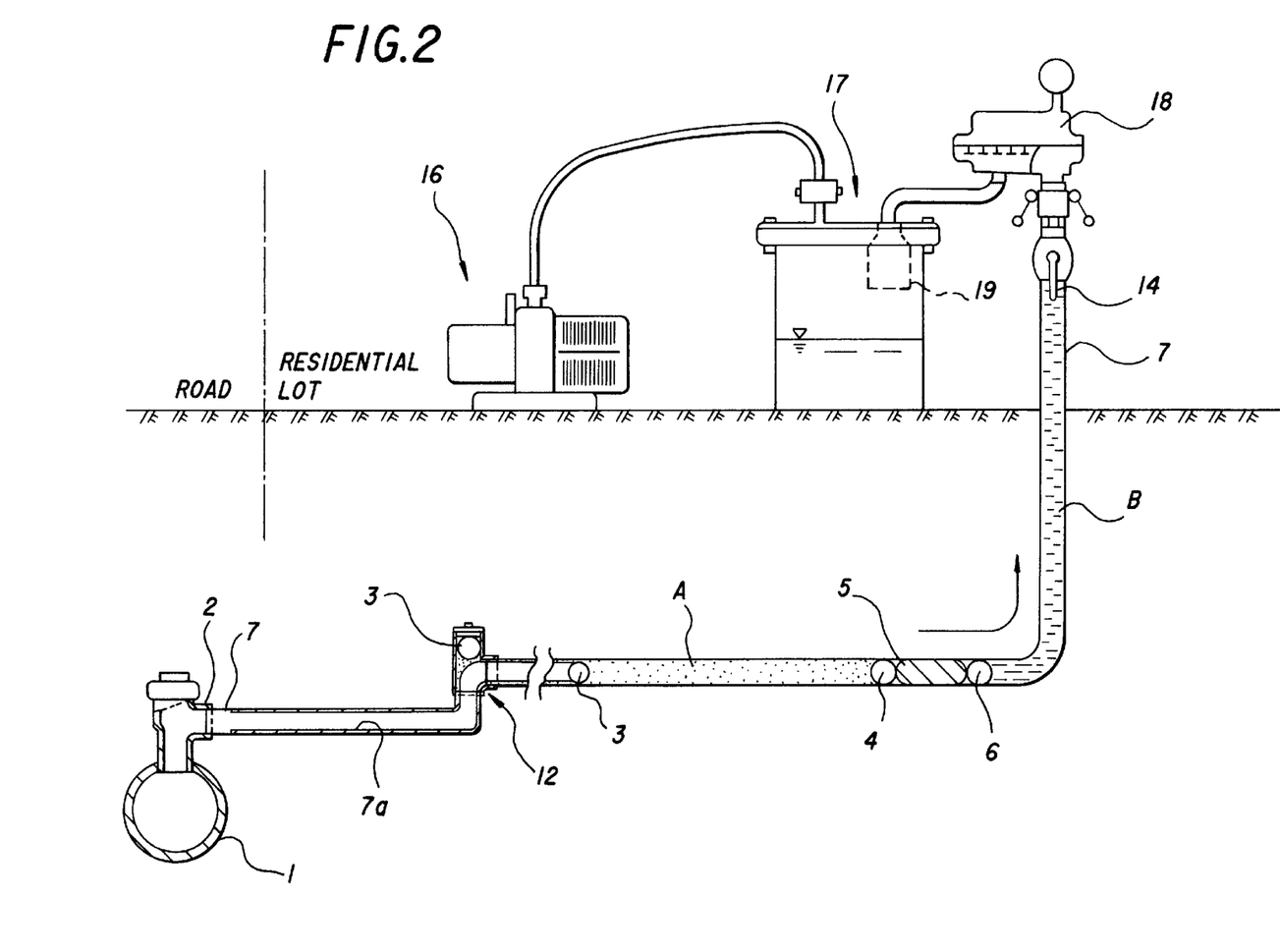
FIG. 2 is an explanatory view illustrating a second step of the method according to the first aspect of the present invention.

Referring to FIG. 2 illustrating a second step of the method according to the first aspect of the present invention, a pig receiving device 18 is attached on the open end 14 of the pipe 7 in order to receive pigs returning from the pipe 7. A tank 17 is connected with the pig receiving device 18 to recover liquid B flowing back from the pipe 7. A resin separating means 19, which allows the passing of liquid but stops the resin mixed in the liquid, is provided within the tank 17. A suction pump 16 is connected with the tank 17.

By operating the suction pump 16, the liquid B is sucked back from inside the pipe 7, so that the liquid blocking pig 6, liquid absorbing material 5, resin transporting pig 4, resin A and lining pig 3 are all moved back. As illustrated in FIG. 2, while the resin plug flow A is being moved back, a resin layer 7a is formed on the internal surface of the pipe 7. With the use of the lining pig 3 which survived the danger of getting stuck in the recess portion of the tee member 12, it is possible to form an even resin layer 7a having a uniform thickness on pipe internal surface along the entire length of the pipe 7.

Also, there is a possibility that none of the lining pigs 3 enters the recess portion of the tee member 12 during the above first step, but one of them enters thereinto during the second step. However, with the use of the method according to the first aspect of the present invention, it is also possible to ensure at least one lining pig 3 to be used in this second step to form an even resin layer 7a.

Figure 3:
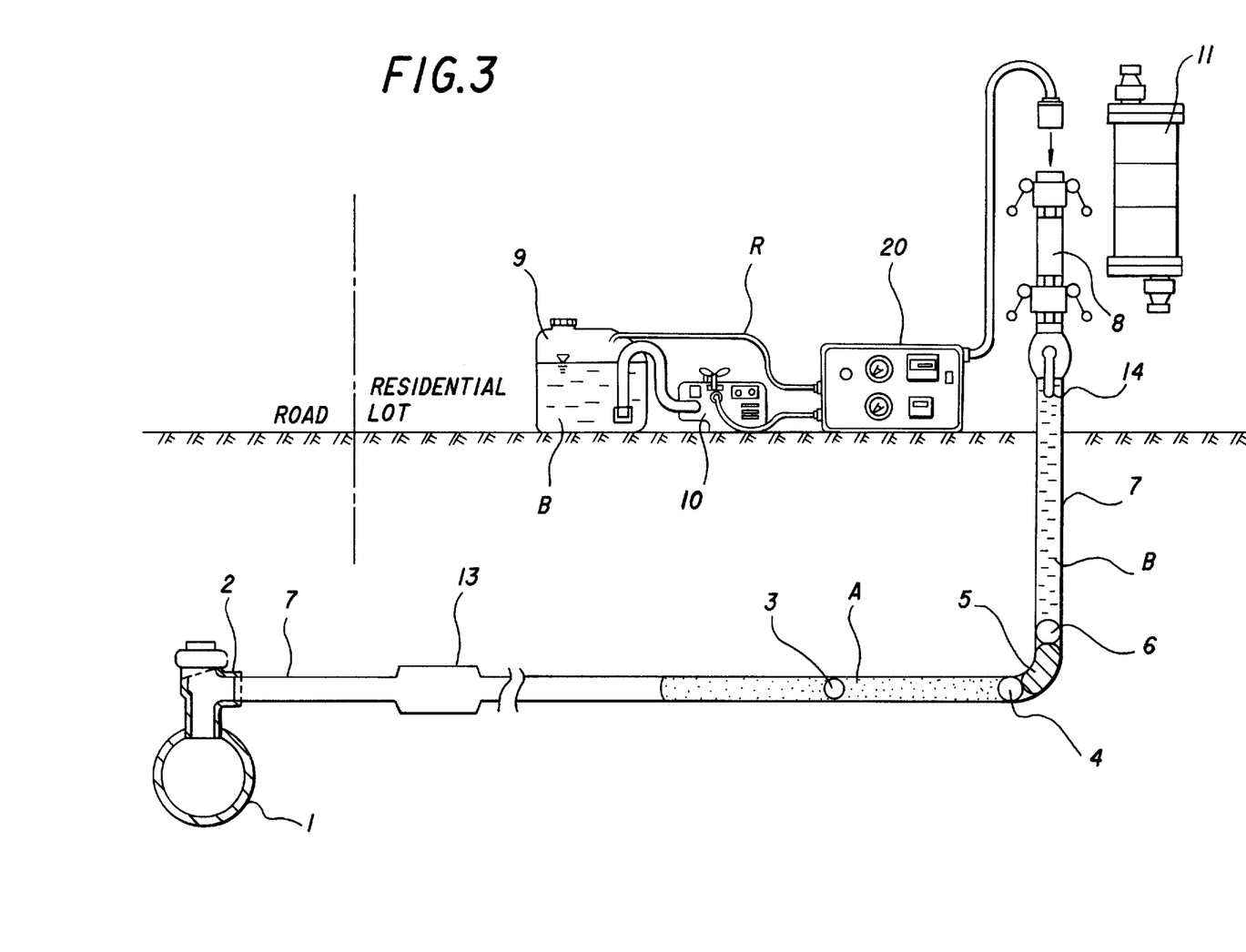
FIG. 3 is an explanatory view illustrating a first step of a method according to the second aspect of the present invention.

Referring to FIG. 3 illustrating a first step of a method according to the second aspect of the present invention, similarly the existing gas service pipe 7 is buried under ground branching from the gas main 1 and extending to a user's house. Also, as in the method according to the first aspect of the present invention, close to the open end 14 of the gas service pipe 7 are disposed the liquid injection controlling device 20, the liquid pump 10 and the liquid tank 9, connected in series toward pipeline by means of several hoses. Similarly, the hose R is used to allow an extra liquid to flow back to the liquid tank 9 if the pressure of a liquid being supplied through the liquid pump 10 exceeds a predetermined value.

At first, by operating the liquid pump 10 and using the resin injection device 11, a first batch of a resin is introduced into the pipe 7 by a force of a pressurized liquid (such as water) being pumped through the liquid pump 10. Then, the same lining pig 3 as above is inserted into the pipe 7, and a second batch of the resin is introduced into the pipe in the same manner as the first batch. The first and second batches of resin together constitute a resin plug flow A in the pipe 7. Afterwards, a resin transporting pig 4, a liquid absorbing material 5 and a liquid blocking pig 6 are introduced into the pipe by the force of the same pressurized liquid, with the use of a pig cassette 8. Subsequently, by continually operating the pump 10, a necessary amount of liquid B is pumped from the liquid tank 9, to flow through the liquid injection controlling device 20 into the pipe 7. In this way, the lining pig 3, the resin A, the resin transporting pig 4, the liquid absorbing material 5 and the liquid blocking pig 6 are all moved forward through the pipe 7.

Figures 4A, 4B:
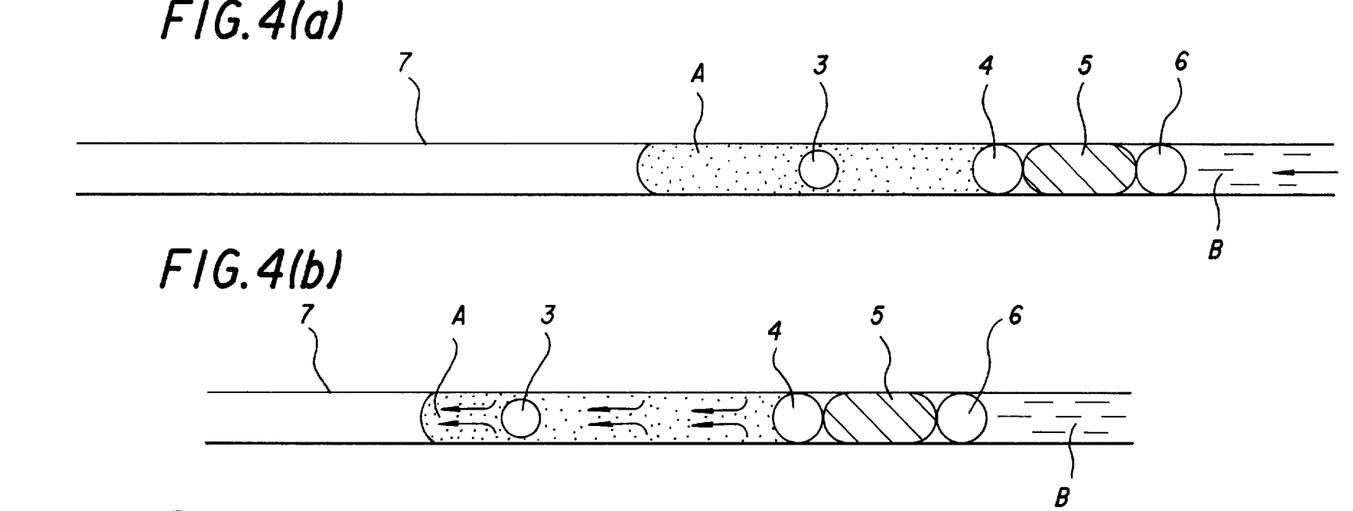
FIG. 4(a), FIG. 4(b), and FIG. 4(c) are explanatory views illustrating in detail the method according to the second aspect of the present invention.
Figure 4C:
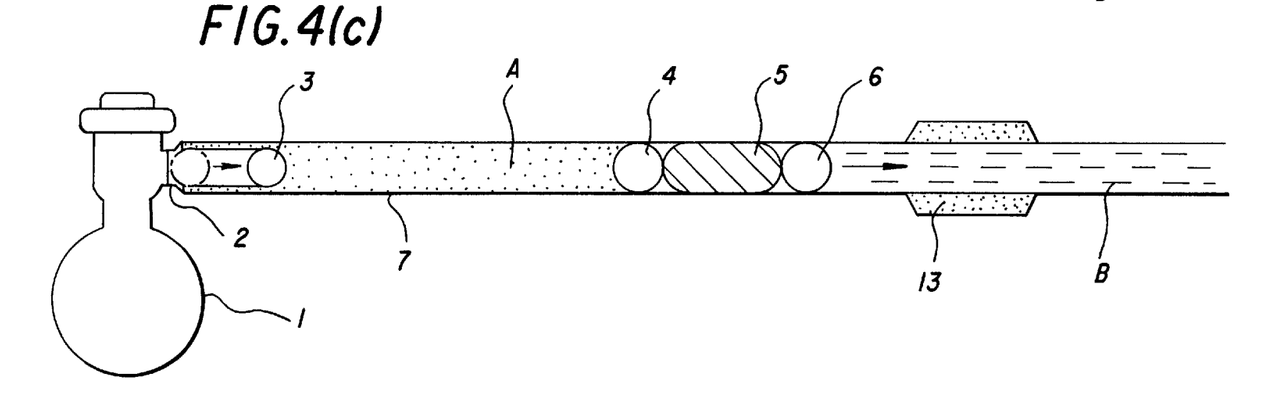

Referring again to FIG. 3, the gas service pipe 7 involves a larger diameter portion 13 on its way. Further referring to FIGS. 4(a)–4(c), while the resin A is moving through the pipe 7 and encounters the larger diameter portion 13, the larger diameter portion 13 will be filled with the resin so that the lining pig 3 can smoothly move past the larger portion 13 instead of dropping thereinto. Also, since the central speed of a fluid flowing through a pipe is greater than that adjacent to pipe internal wall, while the resin A containing the lining pig 3 is moving through the pipe 7, the lining pig 3 moves more and more forward through the resin plug flow A, so that when the front end of the resin plug flow A reaches an inner end 2 (a position branching from the gas main 1) the lining pig 3 will be located in the front of the resin.

Figure 5:
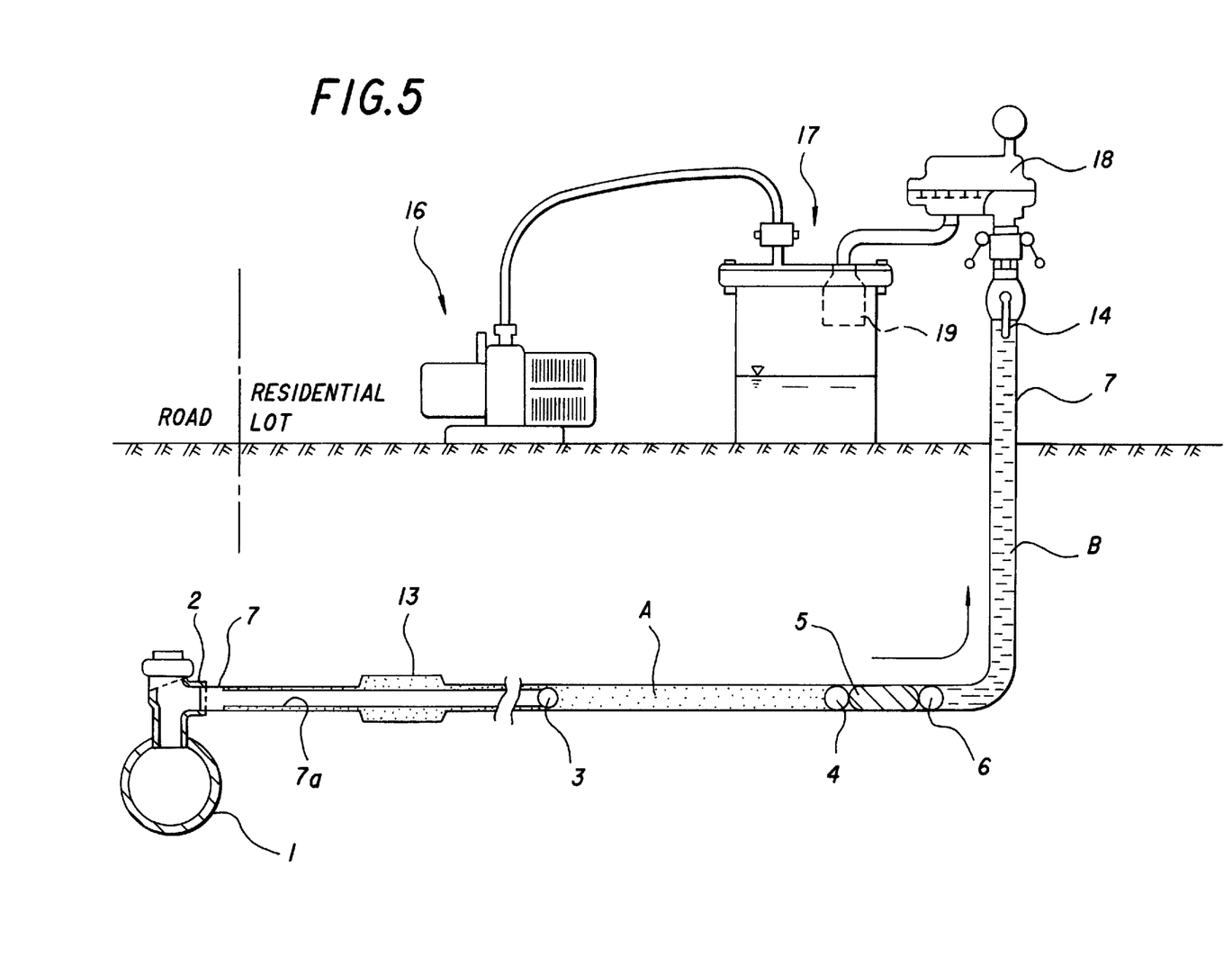
FIG. 5 is an explanatory view illustrating a second step of the method according to the second aspect of the present invention.

Referring to FIG. 5 illustrating a second step of the method according to the second aspect of the present invention, similarly the pig receiving device 18 is attached on the open end 14 of the pipe 7 in order to receive pigs returning from the pipe 7. The tank 17 is connected with the pig receiving device 18 to recover liquid B flowing back from the pipe 7. The resin separating means 19, which allows the passing of liquid but stops the resin mixed in the liquid, is provided within the tank 17. The suction pump 16 is connected with the tank 17.

By operating the suction pump 16, the liquid B is sucked back from inside the pipe 7, so that the liquid blocking pig 6, liquid absorbing material 5, resin transporting pig 4, resin A and lining pig 3 are all moved back. As illustrated in FIG. 5, with the resin plug flow A being moved back, a resin layer 7a is formed on the internal surface of the pipe 7. By means of the lining pig 3 which has survived the danger of dropping into the larger diameter portion 13, it is possible to form an even resin layer 7a having a uniform thickness on pipe internal surface along the entire length of the pipe 7.

Figure 6:
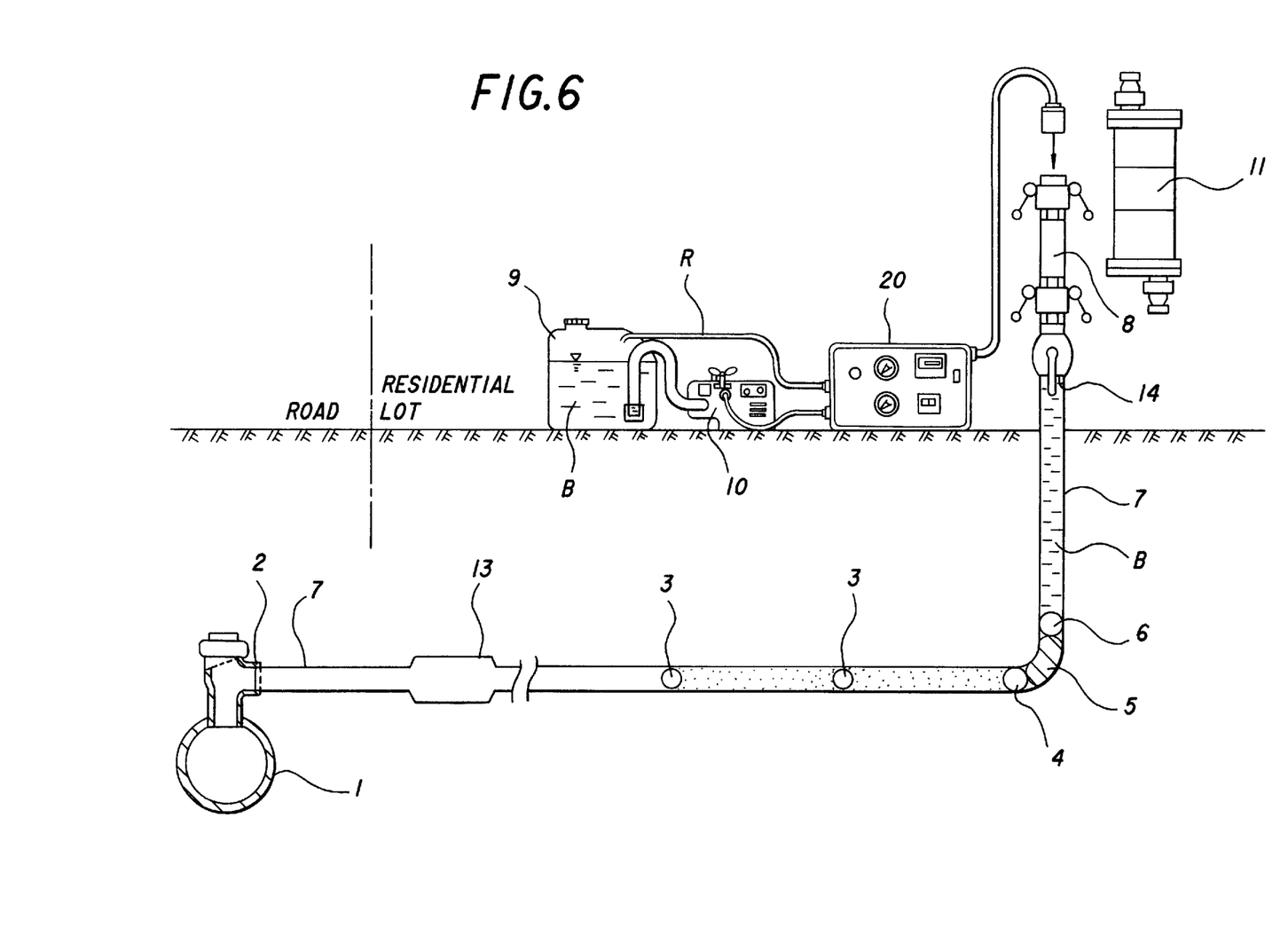
FIG. 6 is an explanatory view illustrating a first step of a method according to the third aspect of the present invention.

FIG. 6 is an explanatory view illustrating a first step of a method according to the third aspect of the present invention. The method as shown in FIG. 6 is almost the same as the method shown in FIGS. 3–5 except that another lining pig 3 is inserted into the pipe 7 before introducing the first batch of resin. Therefore, when the front end of the resin plug flow A reaches an inner end 2 (a position branching from the gas main 1), there will be two lining pigs 3 located in front of the resin plug flow A if the foremost lining pig survives the danger of dropping into the larger diameter portion 13 or a tee member (not shown). With the use of the two lining pigs 3, it can be expected to form an even resin layer having a uniform thickness and more smoothing surface on pipe internal wall along the entire length of the pipe 7. In fact, the method as illustrated in FIG. 6 is proved to be effective to ensure at least one lining pig 3 for use in the second step of the method, despite the fact that an existing underground pipe involves the larger diameter portion 13 or a tee member (not shown).

Figure 7:
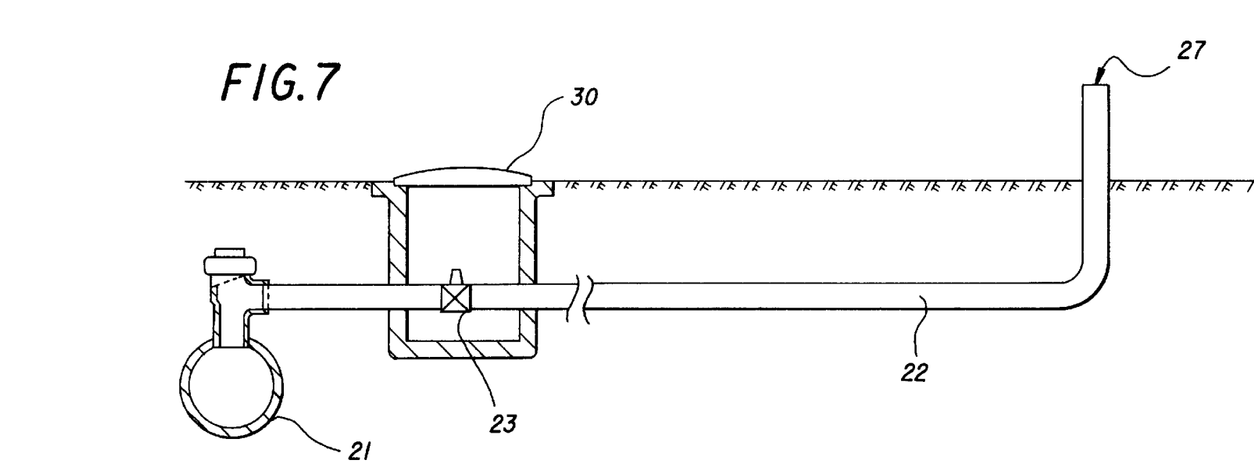
FIG. 7 is an explanatory view illustrating an underground pipe to be treated in the method according to the fourth aspect of the present invention.
Figure 8:
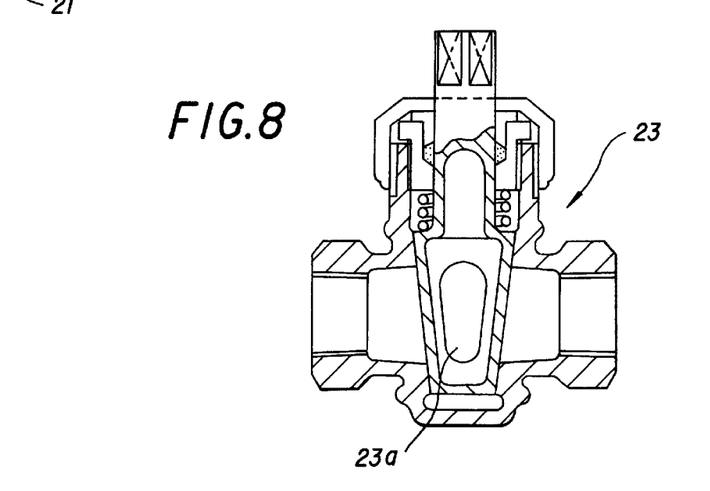
FIG. 8 is a cross sectional view illustrating a narrow-passing section such as a valve installed on the way of the underground pipe of FIG. 7.

FIG. 7 is an explanatory view illustrating an existing underground pipe 22 involving a narrow-passing section 23 such as a valve located in a manhole 30. The pipe 22 is also a gas service pipe branching from a gas main 21. Before the pipe 22 is treated in a resin lining treatment, the valve 23 is operated so as to be in its completely opened position. Although the valve 23 may be operated into its completely opened position, a possible cross section of its passage is nothing but an area 23a as shown in FIG. 8. In fact, the cross section of the passage available through the valve 23 is only ½ of that of the pipe 22.

Figure 9:
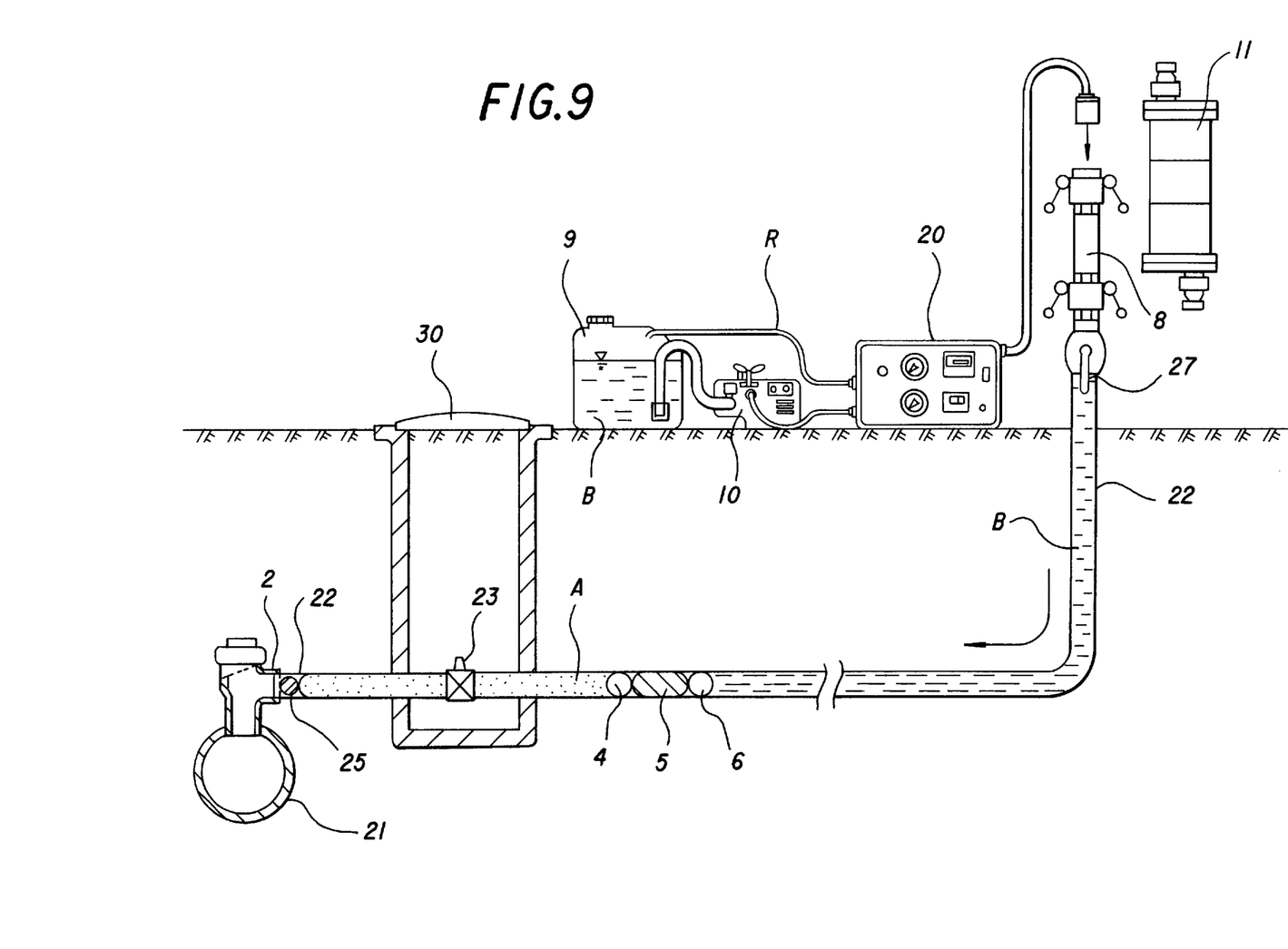
FIG. 9 is an explanatory view illustrating a first step of the method according to the fourth aspect of the present invention.

Prior to lining treatment, a necessary amount of resin is calculated such that after the resin is introduced into the pipe 22 and the front end of the resin plug flow A reaches an inner end thereof (a position branching from the gas main 21), the rear end of the resin plug flow A will stay behind the valve 23, as shown in FIG. 9.

FIG. 9 illustrates a first step of a method according to the fourth aspect of the present invention, i.e., a method of lining the internal surface of the underground gas service pipe 22 involving a narrow-passing section 22 such as the valve. At first, a specifically constructed lining pig 25 is inserted in the pipe 22 through its open end 27. Then, utilizing the same equipments and materials as in the above-described methods, i.e., operating the liquid pump 10 and using the resin injection device 11, a necessary amount of resin A as calculated above is introduced into the pipe 22 by a force of a pressurized liquid (such as water) being pumped from the liquid tank 9. Afterwards, the resin transporting pig 4, liquid absorbing material 5 and liquid blocking pig 6 are introduced into the pipe by the force of the same pressurized liquid, with the use of the pig cassette 8. Subsequently, by continually operating the pump 10, a necessary amount of liquid B is pumped from the liquid tank 9, to flow through the liquid injection controlling device 20 into the pipe 22. In this way, the lining pig 25, the resin A, the resin transporting pig 4, liquid absorbing material 5 and liquid blocking pig 6 are forced to move forward through the pipe 22, with only the lining pig 25 and part of the resin A passing through the valve 23, until the front end of the resin plug flow A reaches an inner end (a position branching from the gas main 21) of the pipe 22.

Figure 10:
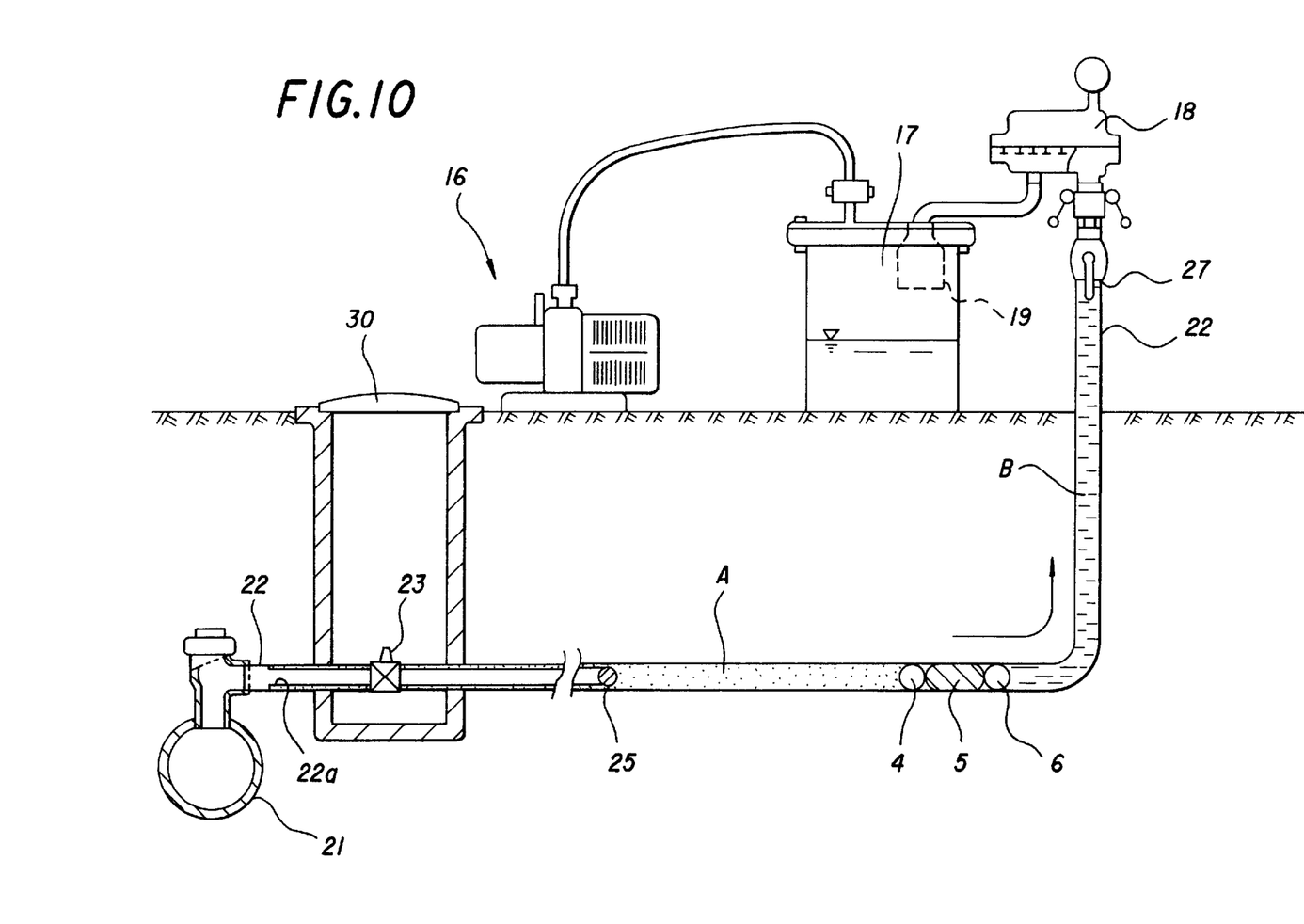
FIG. 10 is an explanatory view illustrating a second step of the method according to the fourth aspect of the present invention.

FIG. 10 illustrates a second step of the method according to the fourth aspect of the present invention. Also, utilizing the same equipments and materials as in the above-described methods, i.e., by operating the suction pump 16, the liquid B is sucked back from inside the pipe 22, so that the liquid blocking pig 6, liquid absorbing material 5, resin transporting pig 4, resin A and lining pig 25 are all moved backwardly. As illustrated in FIG. 10, while the resin plug flow A is being moved back, a resin layer 22a is formed on the internal surface of the pipe 22. With the use of the lining pig 25, it is allowed to form an even resin layer 22a having a uniform thickness on pipe internal surface of the pipe 7 along the entire length thereof.

Figure 11:
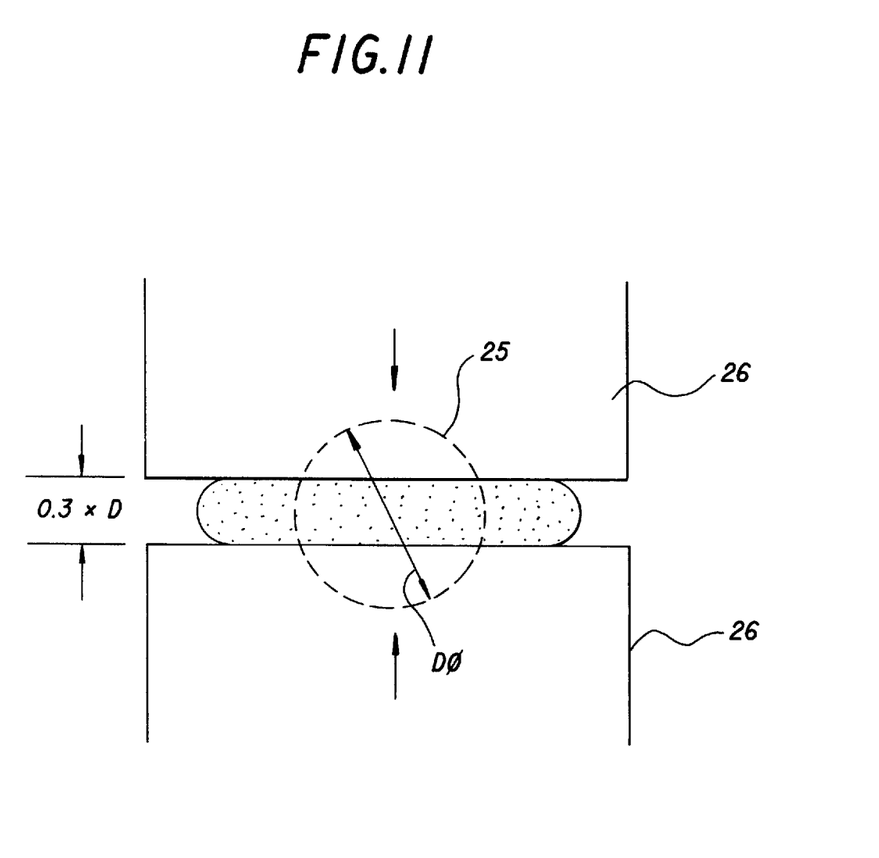
FIG. 11 is an explanatory view illustrating an extent to which a lining pig for use in the method of FIGS. 9 and 10 can deform.

In particular, the lining pig 25 used in the method of FIGS. 9–10 is made of a soft material capable of deforming so as to pass through the narrow-passing section such as the valve 23. In detail, the lining pig 25 is a spherical body made of a silicon rubber capable of deforming into a flat shape having a thickness that is ⅓ or less of its original ball diameter, if pressed between a pair of rams 26 as illustrated in FIG. 11.

Figure 12:
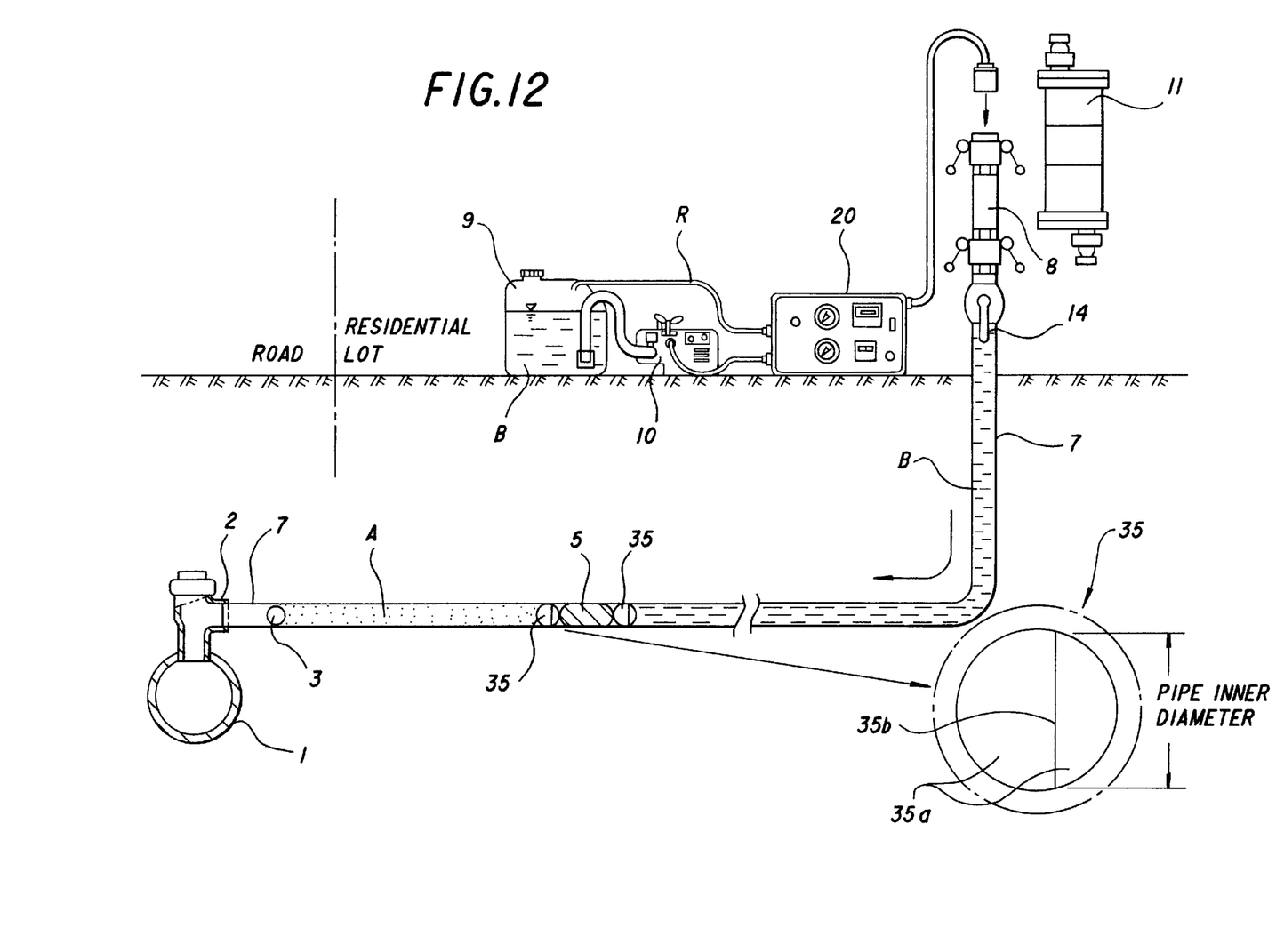
FIG. 12 is an explanatory view illustrating a first step of a method according to the fifth aspect of the present invention.
Figure 14:
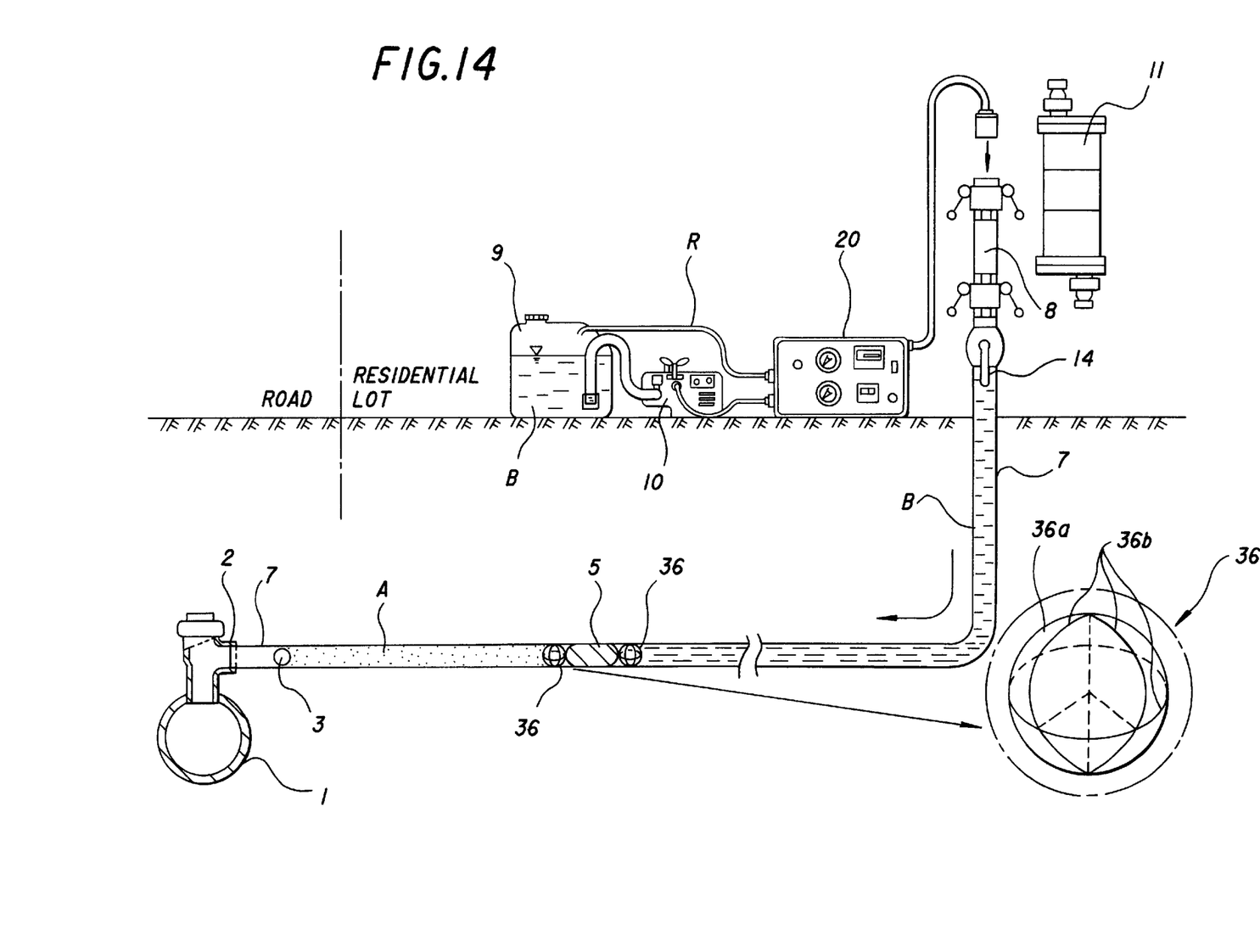
FIG. 14 is also an explanatory view illustrating the first step of the method according to the fifth aspect of the present invention.

FIGS. 12 and 14 are explanatory views illustrating a first step of a method according to the fifth aspect of the present invention.

As illustrated in FIGS. 12 and 14, a same lining pig 3 as above is inserted into the pipe 7 from its open end 14. Then, utilizing the same equipments as in the above-described methods, i.e., operating the liquid pump 10 and using the resin injection device 11, a necessary amount of resin A is introduced into the pipe 7 by a force of a pressurized liquid (such as water) being pumped through the liquid pump 10. Afterwards, a first liquid blocking pig 35 or pig 36, a same liquid absorbing material 5, a second liquid blocking pig 35 or 36 are introduced into the pipe 7, with the use of the pig cassette 8. Subsequently, by continually operating the pump 10, a necessary amount of liquid B is pumped from the liquid tank 9, to flow through the liquid injection controlling device 20 into the pipe 22. In this way, the lining pig 3, the resin A, the first liquid blocking pig 35 or pig 36, the liquid absorbing material 5 and the second liquid blocking pig 35 or 36 are forced to move forward through the pipe 7 until the front end of the resin plug flow A reaches the inner end 2 (a position branching from the gas main 1).

As understood in FIGS. 12 and 14, the first and second liquid blocking pigs 35 or 36 also serve as transporting pigs to move the resin A fowardly through the pipe 7.

Figure 13:
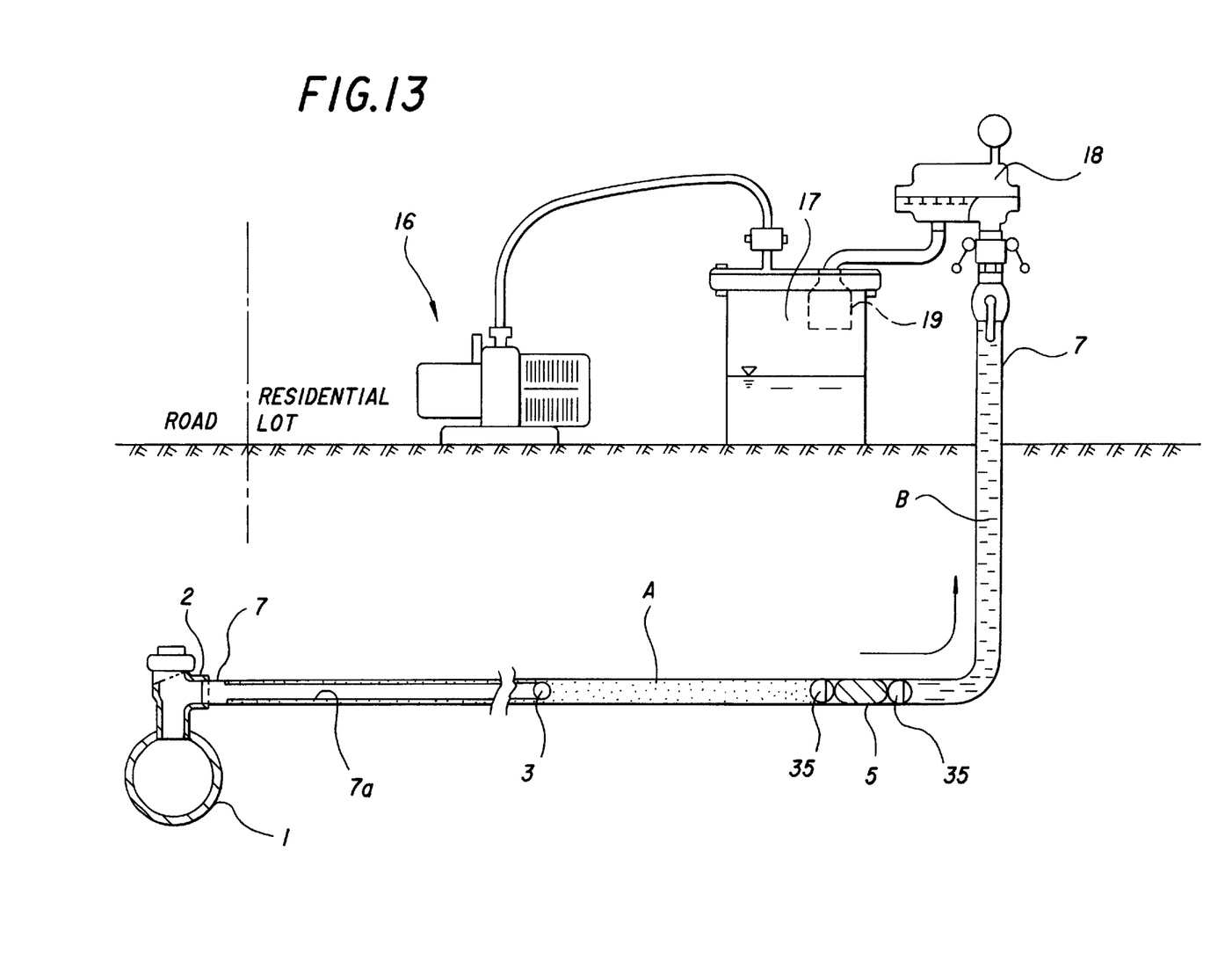
FIG. 13 is an explanatory view illustrating a second step of the method according to the fifth aspect of the present invention.
Figure 15:
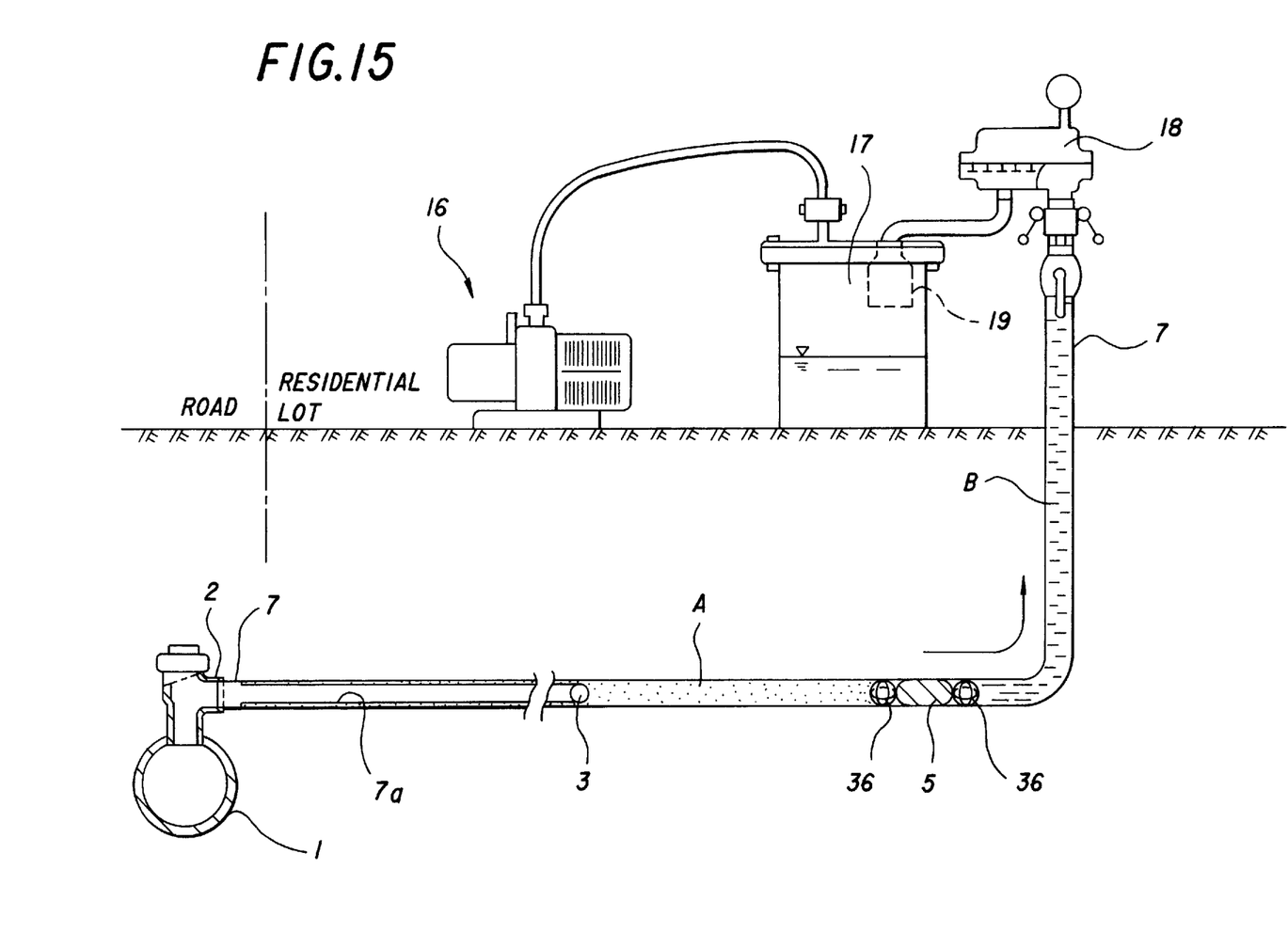
FIG. 15 is also an explanatory view illustrating the second step of the method according to the fifth aspect of the present invention.

FIGS. 13 and 15 illustrate a second step of the method according to the fifth aspect of the present invention.

Also, utilizing the same equipments as in the above-described methods, i.e., by operating the suction pump 16, the liquid B is sucked back from inside the pipe 7, so that the first liquid blocking pig 35 or 36, the liquid absorbing material 5, the second liquid blocking pig 35 or 36, the resin A and the lining pig 3 are all moved backwardly. As illustrated in FIGS. 13 and 15, while the resin plug flow A is being moved back, a resin layer 7a is formed on the internal surface of the pipe 7.

As illustrated in FIG. 12, each of the liquid blocking pigs 35 comprises a spherical body 35a made of a soft resilient material and one flexible liquid barrier diaphragm 35b interposed in the spherical body. The liquid barrier diaphragm 35b is in circular shape having a diameter which is equal to the inner diameter of the pipe 7. In detail, the liquid barrier diaphragm 35b, is interposed in the spherical body 35a at a position offset from the center point of the body 35a and corresponding to the inner diameter of the pipe 7.

When the liquid blocking pigs 35 are used, since each of them receives a uniform pressure from behind, each pig 35 does not roll in the pipe so that the liquid barrier diaphragm 35b can be maintained in a position as shown in FIGS. 12 and 13, thereby preventing the liquid from mixing into the resin A.

As illustrated in FIG. 14, each of the liquid blocking pig 36 comprises a spherical body 36a made of a soft resilient material, and a plurality of flexible liquid barrier diaphragms 36b interposed through the spherical body 36a. Each of the liquid barrier diaphragms 36b is in circular shape having a diameter which is equal to the diameter of the spherical body 36a. In detail, a plurality of flexible liquid barrier diaphragms 36b are interposed in the spherical body 36a each passing through the center point thereof, such that the spherical body 36a is geometrically symmetrically divided into several portions which are the same with one another in terms of shape and size.

In particular, the liquid blocking pig 36 may comprises a spherical body 36a made of a soft resilient material and three flexible liquid barrier diaphragms 36b interposed through the spherical body 36a. Each of said liquid barrier diaphragms 36b is in circular shape having a diameter which is equal to the diameter of the spherical body 36a. In detail, the three flexible liquid barrier diaphragms 36b are interposed in the spherical body 36a each passing through the center point thereof, such that the spherical body 36a is geometrically symmetrically divided into eight portions which are the same with one another in terms of shape and size.

Since the above-described liquid blocking pigs 35 and 36 are quite effective for preventing liquid from mixing into the resin A, it is also possible to use only one of such pigs 35 or 36, dispensing with the use of the liquid absorbing material 5. Therefore, a friction resistance when moving the resin forward and backward through the pipe 7 will be greatly reduced, permitting a more smooth resin lining treatment on the pipe 7.

It is understood from the above description that, with the use of the methods according to the first, second and third aspects of the present invention, at least one lining pig can be ensured to be used in the second step of a pipe lining treatment, so that an even resin lining layer having a uniform thickness may be sure to form on the internal surface of an existing underground pipe.

Further, with the use of the method according to the fourth aspect of the present invention, it is also possible to smoothly perform a lining treatment on an underground pipe involving a narrow-passing section such as a valve.

Moreover, with the use of the method according to the fifth aspect of the present invention, a pressurized liquid is exactly prevented from mixing into the resin while the resin is moved forward and backward in the pipe, so that the adhesive property of the resin is not deteriorated, ensuring that the resin can smoothly adhere to the internal surface of an underground pipe.

While the presently preferred embodiments of the this invention have been shown and described above, it is to be understood that these disclosures are for the purpose of illustration and that various changes and modifications may be made without departing form the scope of the invention as set forth in the appended claims.

What is claimed is:

1. A method of lining an internal surface of a pipe, the method comprising the steps of:

inserting a lining pig into the pipe from an open end thereof:

introducing an amount of a resin, which is necessary to line the internal surface of the pipe, into the pipe from the open end subsequent to the insertion of the lining pig;

providing first and second spherical bodies each of a soft resilient material, as first and second liquid blocking pigs;

interposing a flexible liquid barrier diaphragm inside each of the first and second liquid blocking pigs at a position offset from a center position of the spherical body and corresponding to an inner diameter of the pipe;

forming each liquid barrier diaphragm into a circular shape having a diameter equal to the inner diameter of the pipe;

inserting into the pipe behind the resin a) the first liquid blocking pig, b) a liquid absorbing material for absorbing liquid remaining on the pipe internal surface and c) the second liquid blocking pig for blocking a liquid in order to prevent the resin from mixing with the liquid;

injecting an amount of pressurized liquid into the pipe subsequent to the insertion of the second liquid blocking pig;

forcing the lining pig, the resin, the first liquid blocking pig, the liquid absorbing material and the second liquid blocking pig to move forwardly through the pipe by the pressurized liquid until a front end of the resin reaches an inner end of the pipe; and sucking back the injected pressurized liquid such that the first liquid blocking pig, the liquid absorbing material, the second liquid blocking pig, the resin and the lining pig are moved backwardly through the pipe so as to line the internal surface of the pipe with a layer of the resin wherein an even resin lining layer is evenly applied to the internal surface of the pipe by means of the lining pig.

* * * * *